Oct. 14, 1952   J. M. POWERS   2,614,134
PURIFICATION OF CRYSTALLINE SUBSTANCES
Filed June 21, 1950
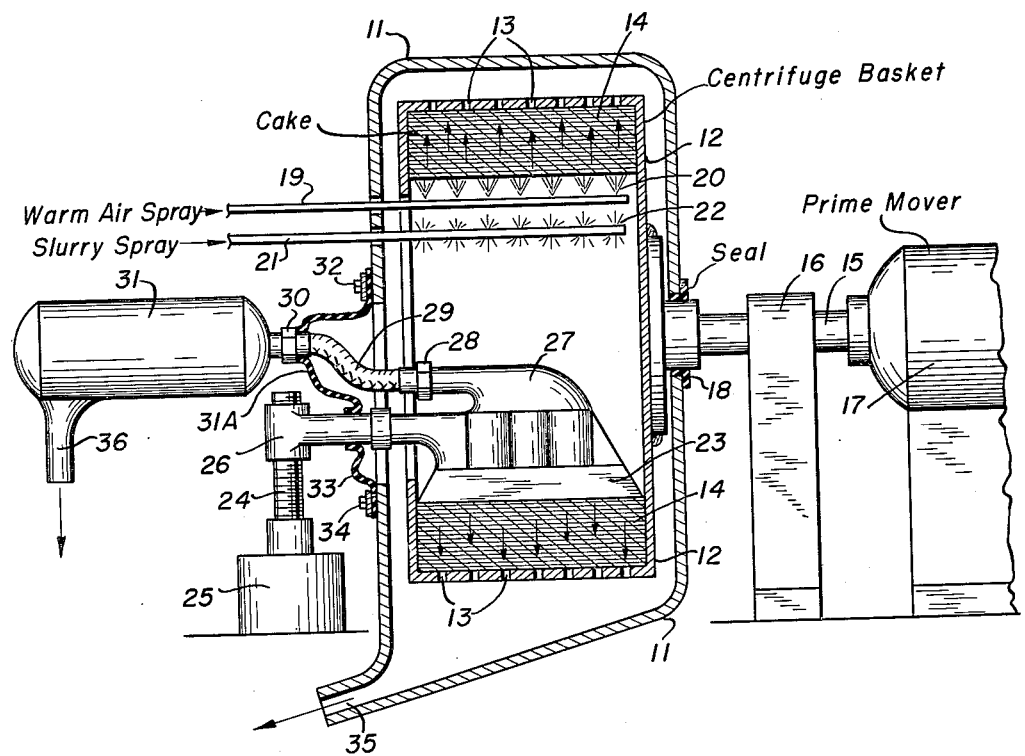
INVENTOR.
BY John M. Powers,
AGENT.

UNITED STATES PATENT OFFICE 2,614,134

PURIFICATION OF CRYSTALLINE SUBSTANCES

John M. Powers, Baytown, Tex., assignor, by mesne assignments, to Standard Oil Development Company, Elizabeth, N. J., a corporation of Delaware Application June 21, 1950, Serial No. 169,451

11 Claims. (Cl. 260—674)

The present invention is directed to the recovery and purification of aromatic hydrocarbons. The invention is particularly directed to the recovery of purified aromatic hydrocarbons as crystals.

The invention may be briefly described as involving the recovery of aromatic hydrocarbon crystals from a slurry of the same in a mother liquor by centrifuging the slurry to form a cake of aromatic hydrocarbon crystals. The cake of aromatic hydrocarbon crystals is heated during the centrifuging operation, the heat being applied at the exposed surface of the crystal cake to melt only the crystals at the exposed surface, which melt, by virtue of the centrifuging operation, is caused to migrate downwardly through the crystal cake and exert a washing action thereon, in effect displacing impurities, such as the mother liquor, by the melted pure hydrocarbon which functions as a washing liquid for the cake. The crystals at the surface of the cake, having been partially melted and the liquid moved downwardly through the cake and outwardly, are in a substantially purified form and may be recovered by removing only that portion of the cake which has been subjected to the partial melting operation. The purified surface of the crystal cake may be removed by a scraper which may embody a vacuum apparatus to remove the purified crystals from the surface of the cake.

The heating operation is preferably conducted by directing a stream or streams of warm gas against the exposed surface of the crystal cake such that the crystal cake is partially melted and the melt forced downwardly by centrifugal action through the cake and outwardly through the centrifuge basket. While it is preferred to use a warm gas, such as air, nitrogen, oxygen and other suitable gaseous materials unreactive with the crystalline material may be used; the surface of the crystal cake may also be suitably heated by employing a source of radiant heat, such as a heated surface which will allow heat to contact only the exposed surface of the crystal cake.

Crystallization is frequently employed as a means of obtaining purified chemical products. Generally, when a material is crystallized from a mixture, or from a solution, the crystals themselves are of extremely high purity although after separating the crystals from the main body of the mixture the gross purity of the sample may be considerably less than 100 per cent. This may be accounted for by the fact that the crystals are contaminated with a film of adhering or mechanically trapped liquid. Among the methods employed to improve the separation of crystals from mother liquor is the application of centrifugal force.

In separating crystals from mother liquor by centrifugation, the slurry containing the crystallized particles is introduced into a centrifuge basket, lined with a porous filter medium such as a screen or cloth, and this basket is whirled at a high speed so that the liquid will be forced through the filter medium by centrifugal action but the solid particles will be retained on the filter. Some of the factors controlling completeness of separation of the liquid from the crystals are (1) the amount of centrifugal force generated by the centrifuge, (2) the viscosity of the liquid, (3) the time of centrifuging, (4) the porosity of the filter medium, and (5) porosity and thickness of the crystal bed. A certain amount of control can be exercised on each of these factors to improve the efficiency of separation. For example, it is known that paraxylene may be caused to crystallize from mixed xylenes by reducing the temperature sufficiently and the resulting crystals can be separated in a basket centrifuge relatively easily if certain conditions are observed. It is necessary that the crystals be produced under conditions that will provide adequate crystal size and the amount of centrifuging be controlled as to centrifugal force exerted over a given length of centrifuging time with a given amount of bed thickness. Listed below are the results from runs on centrifuging a paraxylene slurry which illustrate the effect of spinning time on the purity of the paraxylene obtainable.

| | | | |
|---|---|---|---|
| Feed Temperature, °F | −92 | −92 | −92 |
| Spinning Time at 750 Times Gravity, Min | 10 | 15 | 20 |
| Cake Thickness, Inches | 1¾ | 1¾ | 1½ |
| Paraxylene Purity, Percent | 91.1 | 93.0 | 95.7 |

It will be noted that to achieve the highest purity for a given centrifugal force and cake thickness it is necessary to prolong the centrifuging time and this affects directly the rate of production of paraxylene. In accordance with the present invention it is possible to improve the rate of production and the purity of the product. The cake thickness may be increased for a given length of centrifuging time and purity by employing an operation involving heating of the cake; this can be achieved by introduction of heat so that a small amount of crystals on the inner surface of the crystal bed or cake is melted and the liquid therefrom is forced through the cake by the centrifugal action, thus serving as a wash to force the mother liquor from the cake. By this procedure the mother liquor is actually being displaced by relatively pure melt of the crystalline material that it is desired to purify. In order to demonstrate this further, a run was performed in which paraxylene was separated from mixed xylenes by first chilling to about −90° F., charging to a centrifuge operating with a force of 750 times gravity and, after expelling the major amount of the liquor, heated air at approximately 70° F. was directed over the surface of the crystal cake during the centrifuging period thereby causing a small amount of melting on the exposed surface resulting in a washing action through the crystal bed. The data obtained with and without warm air being employed during the centrifuging operation are shown below:

| Warm Air Added | No | Yes |
|---|---|---|
| Feed Temperature, °F | −92 | −92 |
| Spinning Time at 750 Times Gravity, Min | 20 | 20 |
| Cake Thickness, Inches | ¾ | 1½ |
| Cake Weight, Lbs | 2.1 | 5.2 |
| Paraxylene Purity | 95.3 | 95.0 |

It will be apparent that the weight of 95 per cent purity paraxylene produced in a given centrifuging period was more than doubled. It was observed that a purity gradient was established through the bed; this was determined by sampling portions of the paraxylene from the inner face of the bed and from the portion of the bed next to the filter medium. Analyses which are shown below indicated that an extremely high purity had been obtained on the crystals nearest the heating source while a somewhat lower purity was noted on the crystals nearest the filter medium.

| | Run 1 | Run 2 |
|---|---|---|
| Percent Paraxylene in Cake at Inner Surface | 98.9 | 98.0 |
| Percent Paraxylene in Middle of Cake | 95.7 | 89.3 |
| Percent Paraxylene in Cake at Filter Surface | 9.30 | 88.4 |

This is explained by the fact that paraxylene, melted by the introduction of the heated air, forced the mother liquor ahead and into the interior of the bed thereby leaving behind relatively pure crystals but providing no improvement in purity for the crystals on the outer section of the bed. This action may be continued to provide a relatively high degree of purity throughout the bed by continued application of heat, provided the crystals at the exposed surface of the cake are removed as the heating operation progresses downwardly through the crystalline cake so that only the substantially purified crystals are removed and recovered.

This may be achieved by providing means to remove the exposed or heated surface of the cake such as by scraping the heated surface of the cake so that the crystals (as they attain maximum purity by the washing action of the melt) are removed from the heated area and are discharged from the centrifuge. By this method uniform heating of the crystal bed may be obtained with minimum loss of crystals by melting action. Under these conditions the centrifuge will be automatically unloaded so that it will be prepared for a new charge of cold slurry. The rate of scraping of the surface of the cake may be regulated so that the crystals will be retained in the presence of the heating media only long enough for a small amount to be melted but not long enough for the main portion of the layer to reach a melting temperature.

The advantages of the procedure described are (1) maximum purity of crystals may be obtained without the use of added wash liquid, (2) the efficiency of mother liquor displacement is improved because of the use of some of the paraxylene as wash, (3) the rate at which maximum purity is attained is increased because of the greater uniformity of the application of the washing action, and (4) the centrifuge is discharged or unloaded during the purification step in order that it will be ready to receive a fresh batch of charge.

Although paraxylene has been used as the example to illustrate this invention, the procedure may be employed for a wide variety of crystalline materials that can be melted without decomposition by the application of heated gas at temperatures in the range of −50° F. to 200° F.

As examples of other aromatic hydrocarbons which may be recovered in purified form may be mentioned besides paraxylene, durene, naphthalene, hemimellitene, tertiary butyl benzene and other similar materials. Melting points of the foregoing mentioned aromatic hydrocarbons are presented in the following table:

| | M. P., °F. |
|---|---|
| Paraxylene | 55.7 |
| Durene | 174.5 |
| Naphthalene | 176.3 |
| Hemimellitene (1,2,3, trimethyl benzene) | −13.9 |
| Tertiary butyl benzene | −72.5 |

The temperature at which the slurry of aromatic hydrocarbon crystals is formed in a mother liquor will depend on the aromatic hydrocarbon being purified and its concentration in the mixture. As a general rule, it may be stated that the mixture of the hydrocarbon may be formed into a slurry by cooling the mixture to a temperature at least slightly above the eutectic temperature of the aromatic hydrocarbon to be purified and the first eutectic-forming compound in the mixture. For example, in purifying a mixture of paraxylene which may contain as impurities ortho- and metaxylene, as well as some ethyl benzene, it may be desirable to chill the mixture to a temperature in the range of −90° and −110° F. to obtain a slurry of paraxylene crystals in a mother liquor. It is contemplated that the temperature at which the slurry will be formed will be about the eutectic temperature of the aromatic hydrocarbon and the first eutectic-forming compound.

The present invention will be further illustrated by reference to the drawing in which the sole figure is a front elevation in partial section of apparatus suitable for practicing the invention.

Referring now to the drawing, numeral 11 designates a housing enclosing a centrifuge 12 of the basket type which defines perforations or ports 13 through which mother liquor is discharged from the cake 14, designated by the shaded portion, which is caused to form on the basket 12. The basket centrifuge 12 is actuated through a shaft 15 supported by a journalling means 16 and connected to a prime mover 17, such as an electric motor or other source of power, causing rapid rotation of shaft 15 and centrifuge basket 12. The shaft 15 passes through a stuffing box 18 which forms a seal between the shaft 15 and the housing 11.

The housing 11 and the basket centrifuge 12 are provided with a pipe 19 through which a source of a warm gas, such as air, may be supplied for discharge by way of jets 20 against the cake 14. The housing 11 and basket 12 are also provided with a second pipe 21 through which a cold slurry of an aromatic hydrocarbon may be introduced into the basket 12 by way of sprayer 22.

The centrifuge basket 12 is also provided with a knife or cutter 23 which is arranged to bear against the cake 14 in adjustable relationship by means of the screw thread 24 arranged on support 25. The knife 23 may be lowered or raised as desired by suitable adjustment of the housing 26.

The cutter or knife 23 is in the form of the operative head of a carpet vacuum sweeper with the edges defining knife blades to cause removal of the crystals from the surface of the cake 14. The knife 23 is provided with a housing 27 which defines a passageway connected by a coupling 28 to a flexible conduit 29 which, in turn, is connected by coupling 30 to a source of reduced pressure 31. The coupling 30 is connected flexibly by flexible members 31A to the housing 11 by a bolt 32 and to the housing 26 by means not shown. A second flexible member 33 provides a seal between the housing 26 supporting the knife 23 and the housing 11 by means of a bolt 34.

The flexible conduit 29 and the flexible members 31A and 33 may suitably be constructed of a deformable material, such as synthetic rubber, or any of the various plastic materials available on the market which will withstand repeated flexing without rupture and the presence of aromatic hydrocarbons.

The apparatus described in the foregoing drawing may be operated either batch-wise or continuously. If the apparatus is operated batch-wise a charge of slurry, such as a slurry of paraxylene in a mother liquor at a temperature of −100° F., is introduced by way of line 21 to the interior of basket 12. The prime mover 17 is started and the centrifuge basket is operated at a rate sufficiently high to impose a centrifugal force in the range from 400 to 1000 times gravity. A centrifugal force of 750 times gravity gives good results in separating purified paraxylene from the slurry. Once the charge is in basket 12 and the prime mover 17 is rotated at a rate sufficient to impose a centrifugal force of 750 times gravity, a cake equivalent to cake 14 is built up therein. The mother liquor is forced through the cake in the direction indicated by the arrows. During the centrifuging operation a stream of a warm gas, such as air, at a temperature in the range from −50° to 200° F., is introduced thereto and is caused to be directed against the face or exposed surface of the cake 14 which causes a partial melting of the crystals at the surface to form a wash liquid which migrates outwardly through perforations 13 and exerts a washing action on the crystalline surfaces. By the adjustment of the knife 23 by the screw 24, the knife edge is continuously advanced until all of the cake has been removed from the centrifuge basket. Since the surface of the cake is being continuously melted to a slight degree, the crystals remaining at the exposed surface of the cake 14 are continuously being further purified as the warm air is introduced continuously through line 19 and jets 20. The mother liquor is withdrawn from the housing 11 by discharge port 35. It is to be understood that if a batch or continuous operation is employed, the mother liquor withdrawn by discharge port 35 may be re-chilled and charged again through line 21 to the centrifuge basket 12, as has been described. The purified paraxylene as recovered crystals may be discharged from the source of reduced pressure 31 by discharge port 36. The source of reduced pressure 31 may include therein suitable heating means to liquefy the crystals introduced thereby through conduit 29 and coupling 30.

It will be seen from the foregoing description taken with the drawing that purified aromatic hydrocarbon crystals may be obtained without introducing any washing liquid, the cake itself furnishing a source of wash liquid by virtue of the partial melting of the exterior surface of the cake 14 which displaces any liquid entrained in or held by the crystals formed in cake 14.

The nature and objects of the present invention having been completely described and illustrated, what I wish to claim as new and useful and to secure by Letters Patent is:

1. In the recovery of aromatic hydrocarbon crystals from a mother liquor by centrifuging a slurry containing said hydrocarbon to form a cake of aromatic hydrocarbon crystals, the steps of heating the exposed surface of said cake during centrifuging to a temperature sufficiently high to melt only the exposed surface of said cake and removing crystals from the surface of the crystal cake to recover aromatic hydrocarbon of high purity.

2. In the recovery of aromatic hydrocarbon crystals from a mother liquor by centrifuging a slurry containing said hydrocarbon to form a cake of aromatic hydrocarbon crystals, the steps of heating the exposed surface of said crystal cake during centrifuging with a relatively warm gas at a temperature sufficiently high to melt only the exposed surface of said cake and removing crystals from the surface of the crystal cake exposed to the warm gas to recover aromatic hydrocarbon of high purity.

3. A method in accordance with claim 2 in which the aromatic hydrocarbon crystals are crystals of paraxylene.

4. A method in accordance with claim 2 in which the warm gas is air at a temperature in the range from −50° to 200° F.

5. A method for recovering aromatic hydrocarbon crystals from a slurry of same in a mother liquor which comprises centrifuging said slurry to form a cake of aromatic hydrocarbon crystals, heating the exposed surface of said crystal cake during centrifuging with a relatively warm gas at a temperature sufficiently high to melt only the exposed surface of said cake and removing crystals from the surface of the crystal cake exposed to the warm gas to recover aromatic hydrocarbon crystals of high purity.

6. A method in accordance with claim 5 in which the aromatic hydrocarbon crystals are crystals of paraxylene.

7. A method in accordance with claim 5 in which the warm gas is air at a temperature in the range from −50° to 200° F.

8. A method for recovering a substantially pure crystallizable aromatic hydrocarbon from a mixture of same with at least one compound which forms a eutectic with a portion of the aromatic hydrocarbon, which comprises forming a slurry of crystals from said mixture at the eutectic temperature of said crystallizable aromatic hydrocarbon and said compound, centrifuging said slurry to form a cake of said aromatic hydrocarbon crystals and said compound, heating the exposed surface of said crystal cake during centrifuging with a relatively warm gas at a temperature sufficiently high to melt only the exposed surface of said cake and removing crystals from the surface of the crystal cake exposed to the warm gas to recover substantially pure aromatic hydrocarbon crystals.

9. A method in accordance with claim 8 in which the crystallizable aromatic hydrocarbon is paraxylene.

10. A method in accordance with claim 8 in which the warm gas is air at a temperature in the range from —50° to 200° F.

11. A method for recovering paraxylene from a mixture of same with at least one isomer thereof which comprises forming a slurry of crystals from said mixture at a temperature in the range from —90° F. to —110° F., centrifuging said slurry to form a cake of paraxylene crystals, heating the exposed surface of said cake during centrifuging with air at a temperature in the range from 60° F. to 80° F. to melt only the exposed surface of said cake, and removing paraxylene crystals from the surface of the crystal cake exposed to the warm air to recover substantially pure paraxylene.

JOHN M. POWERS.

REFERENCES CITED

The following references are of record in the file of this patent:

UNITED STATES PATENTS

| Number | Name | Date |
|---|---|---|
| 1,836,211 | Weiland et al. | Dec. 15, 1931 |
| 2,398,526 | Greenburg | Apr. 16, 1946 |
| 2,541,682 | Arnold | Feb. 13, 1951 |